May 3, 1927.

H. ZOELLY

POWER DRIVEN VEHICLE

Filed June 8, 1926

1,627,303

Inventor
Heinrich Zoelly

Patented May 3, 1927.

1,627,303

UNITED STATES PATENT OFFICE.

HEINRICH ZOELLY, OF ZURICH, SWITZERLAND.

POWER-DRIVEN VEHICLE.

Application filed June 8, 1926, Serial No. 114,464, and in Switzerland June 13, 1925.

The present invention relates to improvements in power driven vehicles of the type provided with two frames cushioned against each other and one of which frames carries at least three wheel axles and is comparatively light whilst the other is spring cushioned against the former in the vertical direction and carries the driving device for the vehicle. The object of the invention is to further increase the smooth running of the vehicle and to eliminate shocks. To this end according to the present invention the wheel axles acted upon by springs are so mounted in the lower frame that they still act as rigidly mounted axles when the vehicle travels over depressions in the ground as stops prevent a downward movement of the axles and consequently the falling of the wheels into these depressions, whilst when travelling over rising parts in the road, stones and the like the springs allow for play of the axles in the upward direction.

A constructional example of the subject matter of the present invention is illustrated on the accompanying drawings, in which:

Figs. 2–4 illustrate on a larger scale the behaviour of a wheel when travelling over rising parts and depressions in the ground, wherein Fig. 2 is a section along line II—II in Fig. 3 and Fig. 3 is a section along line III—III in Fig. 2.

Figure 1:
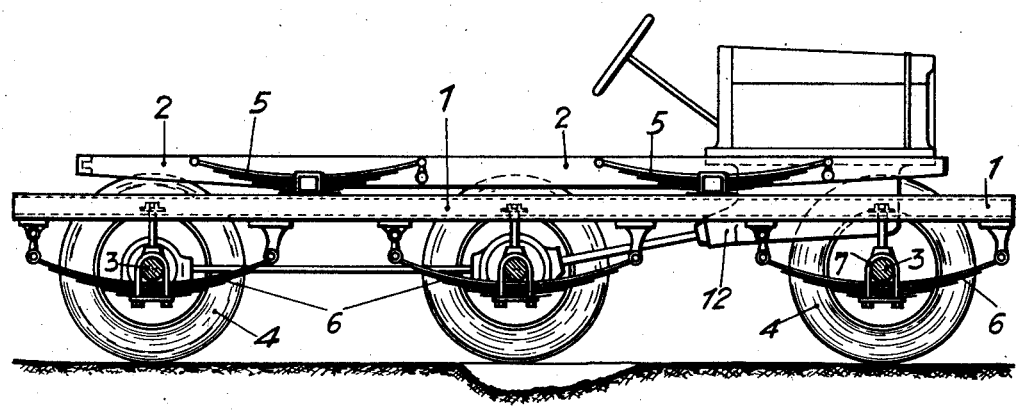
Fig. 1 is an elevation view of the power driven vehicle.
Figures 2, 3, 4:
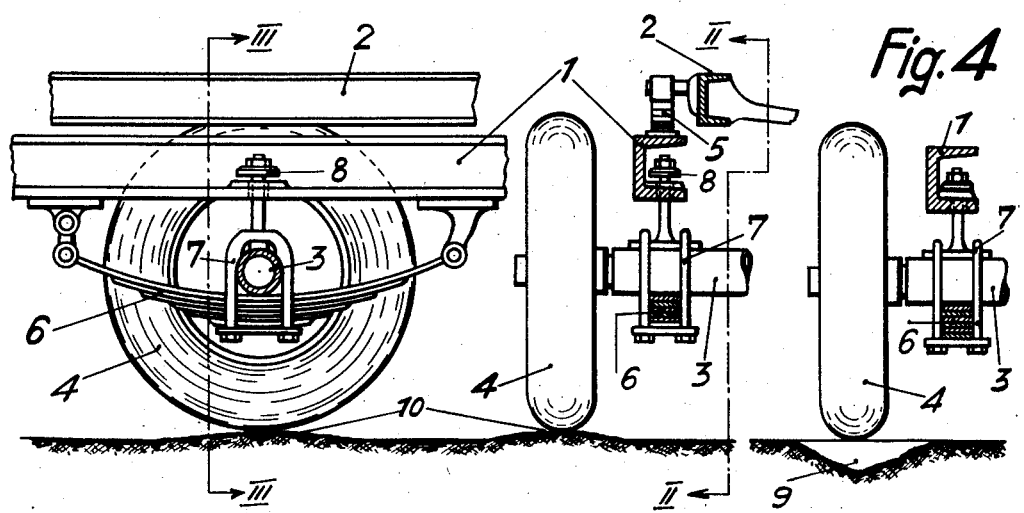

In the drawing 1 denotes the frame carrying the wheel axles 3 and 2 denotes the second frame cushioned against the frame 1 by means of springs 5 and supporting the vehicle body, not illustrated on the drawing, as well as the driving motor of which the lower part of its casing 12 is shown. The wheel axles 3 bear on springs 6 and are carried by means of stirrups 7 embracing also these springs 6; each of the stirrups is provided with a stop 8 (Figs. 2–4) intended for cooperation with the frame 1.

When the vehicle travels over a depression 9 in the ground (Fig. 4), the wheel 4 coming above the depression is prevented from dropping into the depression 9 by the stirrup 7 acting as a fixed stop so that the respective wheel axle acts like a rigidly mounted axle. Thereby an increase in the load of one sixth acts upon the remaining five wheels which run on the ground, which increased load is mainly taken up by the springs 6 of these five wheels 4 so that the springs 5 are practically not influenced thereby. Consequently a very soft travelling is obtained. On the other hand when travelling over a rising part 10 in the ground (Figs. 2–3), a stone or the like the spring 6 permits the respective axle 3 to yield in the upward direction. In consequence thereof the travelling of the vehicle is decidedly softer and steadier than the travelling of a power driven vehicle having two frames cushioned against each other and more than three axles rigidly mounted in the lower of these frames, as in the present case only the weight of the axles is not taken up by springs whilst the weight of the frame 1 is also supported on springs. Thereby the shocks resulting from travelling over small rising parts in the ground, stones and the like are practically completely taken up by the springs 6 and are not transmitted to the springs 5 which fact materially enhances a soft travelling. On the other hand every progress obtainable with the vehicles having two frames cushioned against each other and more than two axles rigidly connected to the lower frame is fully maintained with the present novel construction as the wheel axles 3 act still in the manner of axles rigidly mounted in the frame 1 when travelling over depressions in the road.

The particular design of the stirrups 7 and of the stops 8 provided in connection with the stirrups is immaterial to the gist of the present invention, it is only essential that they find a rigid abutment on the frame 1.

I claim:

1. A power-driven vehicle, comprising a rigid lower frame, an upper frame, a device for driving the vehicle arranged on said upper frame, resilient means connecting the two frames in the vertical direction, at least three wheel axles mounted by the interposition of springs on said lower frame to allow for play of the axles in the upward direction when the vehicle travels over rising parts in the ground, and means to prevent a downward movement of the axles when the vehicle travels over depressions in the ground.

2. A power-driven vehicle, comprising a rigid lower frame, an upper frame, a device for driving the vehicle arranged on said upper frame, resilient means connecting the two frames in the vertical direction, at least three wheel axles, means to mount said wheel axles on said lower frame which means include springs and attachments to bring said springs to act on the wheel axles, and abutment means connected to said attachments and resting on the lower frame when the vehicle travels over depressions in the ground to prevent a downward movement of the axles whilst the springs allow for play in the upward direction when the vehicle travels over rising parts in the ground.

3. A power-driven vehicle, comprising a rigid lower frame, an upper frame, a device for driving the vehicle arranged on said upper frame, resilient means connecting the two frames in the vertical direction, at least three wheel axles, means to mount said wheel axles on said lower frame which means include springs connected to said lower frame and stirrups for connecting said wheel axles to said springs, and stops rigidly connected to said stirrups and cooperating with the lower frame to prevent a downward movement of the wheel axles when the vehicle travels over depressions in the ground whilst the springs allow for play in the upward direction when the vehicle travels over rising parts in the ground.

In testimony whereof, I have signed my name to this specification.

HEINRICH ZOELLY.